(12) United States Patent
Youn et al.

(10) Patent No.: US 9,581,734 B2
(45) Date of Patent: Feb. 28, 2017

(54) OPTICAL FILM EXHIBITING EXCELLENT BLOCKING PROPERTIES FOR ULTRAVIOLET LIGHT AND POLARIZING PLATE INCLUDING THE SAME

(71) Applicant: LG CHEM, LTD., Seoul (KR)

(72) Inventors: Suk-Il Youn, Daejeon (KR); Sang-Min Kwak, Daejeon (KR); Kyung-Jae Kwon, Daejeon (KR); Nam-Jeong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/358,981

(22) PCT Filed: Mar. 7, 2014

(86) PCT No.: PCT/KR2014/001863
§ 371 (c)(1),
(2) Date: May 16, 2014

(87) PCT Pub. No.: WO2014/157848
PCT Pub. Date: Oct. 2, 2014

(65) Prior Publication Data
US 2016/0018565 A1  Jan. 21, 2016

(30) Foreign Application Priority Data
Mar. 25, 2013 (KR) .......... 10-2013-0031730

(51) Int. Cl.
*G02B 1/14* (2015.01)
*G02B 1/04* (2006.01)
(Continued)

(52) U.S. Cl.
CPC .... *G02B 1/14* (2015.01); *C08J 5/18* (2013.01); *C08K 5/3492* (2013.01); *C08L 33/12* (2013.01);
(Continued)

(58) Field of Classification Search
CPC . G02B 1/14; G02B 1/04; G02B 5/305; G02B 5/22; G02B 5/30; C08J 5/18;
(Continued)

(56) References Cited

U.S. PATENT DOCUMENTS 6,284,821 B1 * 9/2001 Huglin .............. A61K 8/4966
252/403
2010/0182689 A1  7/2010 Nakanishi et al.
(Continued)

FOREIGN PATENT DOCUMENTS

CN  101243337 A  8/2008
CN  101679710 A  3/2010
(Continued)

*Primary Examiner* — Nancy Johnson
(74) *Attorney, Agent, or Firm* — Dentons US LLP

(57) ABSTRACT

There is provided an optical film including an ultraviolet light absorbent having a first peak with a maximum absorption coefficient of 0.07 to 0.10 $phr^{-1}\mu m^{-1}$ in a wavelength band of 290 to 320 nm and a second peak with a maximum absorption coefficient of 0.11 to 0.16 $phr^{-1}\mu m^{-1}$ in a wavelength band of 330 to 400 nm, and acrylic resin, wherein the content of the ultraviolet light absorbent is 0.3 to 1.0 parts by weight with respect to 100 parts by weight of the acrylic resin, and a polarizing plate including the same.

8 Claims, 4 Drawing Sheets

(51) Int. Cl.
  *C08K 5/3492* (2006.01)
  *C08L 33/12* (2006.01)
  *C08J 5/18* (2006.01)
  *G02B 5/30* (2006.01)

(52) U.S. Cl.
  CPC ............... *G02B 1/04* (2013.01); *G02B 5/305* (2013.01); *C08J 2333/06* (2013.01); *C08J 2333/24* (2013.01)

(58) Field of Classification Search
  CPC ... C08J 2333/24; C08J 2333/06; C08L 33/12; C08K 5/3492
  See application file for complete search history.

(56) References Cited

U.S. PATENT DOCUMENTS

| | | | |
|---|---|---|---|
| 2010/0182690 A1* | 7/2010 | Takao | C08J 5/18 359/485.01 |
| 2011/0272648 A1* | 11/2011 | Fukushima | C08K 5/3492 252/589 |
| 2011/0308712 A1* | 12/2011 | Takebe | C08L 1/02 156/229 |

FOREIGN PATENT DOCUMENTS

| | | |
|---|---|---|
| JP | 2002-169020 A | 6/2002 |
| JP | 4047163 B2 | 11/2007 |
| JP | 2010-065109 A | 3/2010 |
| JP | 2010-65109 A | 3/2010 |
| KR | 10-2011-0106469 A | 9/2011 |
| TW | 200911907 A1 | 7/2010 |
| WO | 2007/119560 A1 | 10/2007 |

\* cited by examiner

OPTICAL FILM EXHIBITING EXCELLENT BLOCKING PROPERTIES FOR ULTRAVIOLET LIGHT AND POLARIZING PLATE INCLUDING THE SAME

This Application is a 35 U.S.C. §371 National Stage entry of International Application No. PCT/KR2014/001863, filed Mar. 7, 2014, which claims the benefit of Korean Patent Application No. 10-2013-0031730, filed on Mar. 25, 2013, both of which are incorporated by reference in their entirety herein.

TECHNICAL FIELD

The present disclosure relates to an optical film exhibiting excellent ultraviolet light blocking properties and a polarizing plate including the same, and in particular, relates to an optical film capable of effectively blocking ultraviolet light within a wide wavelength band, even in the case in which a small amount of an ultraviolet ray absorbent is included therein, and a polarizing plate using the same.

BACKGROUND ART

Polarizing plates currently used in image display units such as liquid crystal displays commonly have triacetyl cellulose films (hereinafter, TAC films) included therewith as protective films, in order to protect a polyvinyl alcohol polarizer. However, TAC films may not have a sufficient degree of heat and humidity resistance, and may therefore have a problem in that the properties of polarizing plates, such as polarization degree or color, may be degraded due to film deformation when used under conditions of high temperature and high humidity. Accordingly, the use of transparent acrylic resin films having excellent heat and humidity resistance, instead of TAC films, has recently been proposed for polarizer protective films.

Meanwhile, technologies in which an ultraviolet ray absorbent is added to a protective film in order to protect a polyvinyl alcohol polarizer from ultraviolet light have also been recently proposed. For ultraviolet light within sunlight, a wavelength band of 320 to 400 nm is referred to as the UVA region, and a wavelength band of 290 to 320 nm is referred to as the UVB region. Light from within the UVA region is not absorbed in the ozone layer and also has high intensity, so thus should be blocked without fail, and although light from within the UVB region is mostly absorbed in the ozone layer, light from within the UVB region needs to be blocked, even in the case that the amount reaching the ground is negligible, since this light has a short wavelength and accordingly, a relatively large amount of energy. However, ultraviolet light absorbent-including protective films that have been proposed to date have problems, in that the ultraviolet light region able to be blocked is limited to light within a wavelength band of 320 to 400 nm.

In addition, in ultraviolet light absorbent-including acrylic optical films that have been proposed so far, a considerable amount of the ultraviolet light absorbent needs to be added in order to achieve a meaningful ultraviolet light blocking effect, however, when a considerable amount of the ultraviolet light absorbent is added, migration, a phenomenon in which an ultraviolet light absorbent strains a casting roll as it is decomposed and escapes from the film when the acrylic resin, melted by high temperature and pressure from an extruder, abruptly goes cold while passing through a T-die and then a casting roll, may be a serious problem in an acrylic film preparation process, and as a result, surface qualities of the exterior of the film may be poor due to the heat decomposed-ultraviolet light absorbent also straining the film.

Furthermore, an ultraviolet light absorbent has a low molecular weight and a low glass transition temperature, therefore, when the content of the ultraviolet light absorbent increases, the molecular weight and the glass transition temperature of an acrylic film including this absorbent also decrease, resulting in the decrease of heat resistance.

Therefore, an acrylic optical film capable of effectively blocking ultraviolet light in wavelength bands of 320 to 400 nm (UVA region) and ultraviolet light in wavelength bands of 290 to 320 nm (UVB region) even in the case that a small amount of an ultraviolet light absorbent is included has been required.

DISCLOSURE

Technical Problem

An aspect of the present disclosure provides an acrylic optical film capable of effectively blocking ultraviolet light of both UVA and UVB regions even in the case that a small amount of an ultraviolet light absorbent is included, and provides a polarizing plate including the same.

Technical Solution

According to an aspect of the present disclosure, there is provided an optical film including an ultraviolet light absorbent having a first peak with a maximum absorption coefficient of 0.07 to 0.10 $phr^{-1}\mu m^{-1}$ in a wavelength band of 290 to 320 nm and a second peak with a maximum absorption coefficient of 0.11 to 0.16 $phr^{-1}\mu m^{-1}$ in a wavelength band of 330 to 400 nm; and an acrylic resin, wherein the content of the ultraviolet light absorbent is 0.3 to 1.0 parts by weight with respect to 100 parts by weight of the acrylic resin.

Herein, the ultraviolet light absorbent may include one or more compounds selected from the group consisting of a compound represented by the following Chemical Formula 1 and a compound represented by the following Chemical Formula 2.

[Chemical Formula 1]

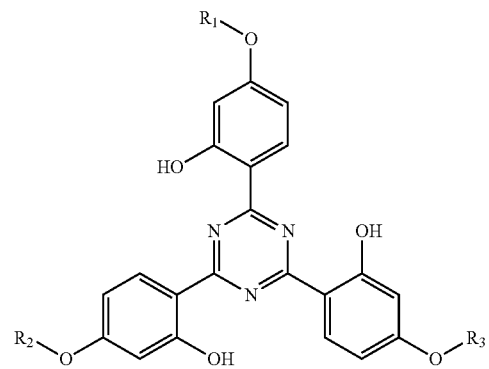

In Chemical Formula 1, $R_1$ to $R_3$ are each independently a substituted or an unsubstituted $C_{1-18}$ alkyl.

[Chemical Formula 2]

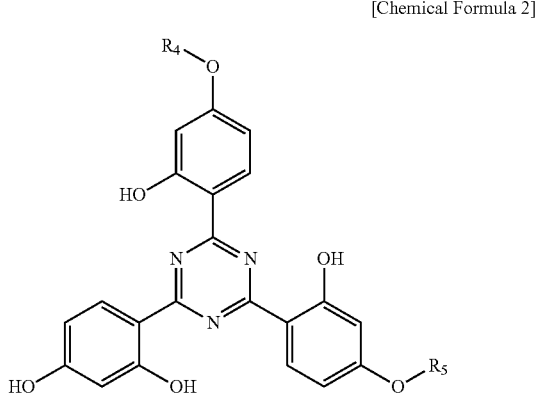

In Chemical Formula 2, $R_4$ and $R_5$ are each independently hydrogen or a substituted or an unsubstituted $C_{1-18}$ alkyl.

More specifically, $R_1$ to $R_3$ of Chemical Formula 1 may be each independently an unsubstituted $C_{1-6}$ alkyl, and $R_4$ and $R_5$ of Chemical Formula 2 be each independently hydrogen or an unsubstituted $C_{1-6}$ alkyl.

For example, the ultraviolet light absorbent may include one or more compounds selected from the group consisting of a compound represented by the following Chemical Formula 1-1 and a compound represented by the following Chemical Formula 2-1.

[Chemical Formula 1-1]

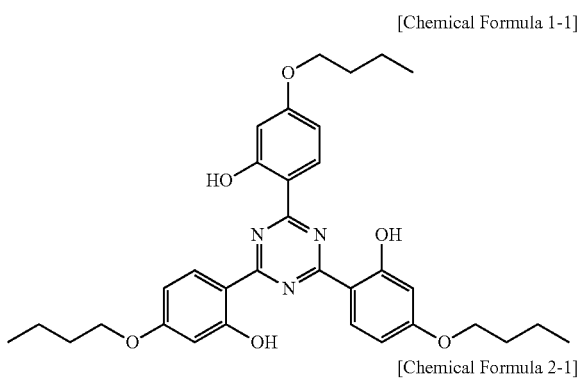

[Chemical Formula 2-1]

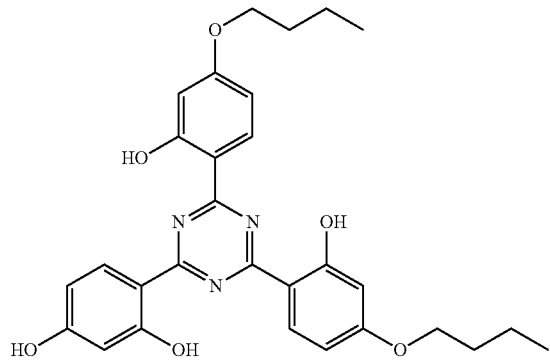

Meanwhile, the optical film may have optical transmittance of 5.5% or less at a wavelength of 290 nm and at a wavelength of 380 nm when measured after conversion into a thickness of 50 μm.

In addition, the optical film may have optical transmittance of 92% or greater in a visible light region.

Furthermore, the optical film may have a thickness of 5 μm to 80 μm.

Meanwhile, the acrylic resin may be a copolymer resin including a (meth)acrylate-based monomer and a styrene-based monomer.

In addition, the ultraviolet light absorbent may have a molecular weight of 400 to 600 g/mol.

According to another aspect of the present disclosure, there is provided a polarizing plate including the optical film on one side or both sides of the polarizer, and an image display unit including the same.

Advantageous Effects

As set forth above, according to exemplary embodiments of the present disclosure, an optical film of the present disclosure has superior ultraviolet light absorption efficiency, is highly effective in lowering the optical transmittance to 5.5% or less at wavelengths of both 290 nm and 380 nm when measured after conversion into a thickness of 50 μm, and the amount of loss due to thermal decomposition during a thermal treating extrusion process is small, since the composition of the optical film is simple, and the amount of the ultraviolet light absorbent included therein is small.

In addition, the ultraviolet light absorbent included in the optical film according to the present disclosure costs less compared to existing ultraviolet light absorbents, therefore, the price competitiveness of the optical film, and the price competitiveness of a polarizing plate and an image display unit including the optical film can be significantly improved.

BEST MODE

Figure 1:
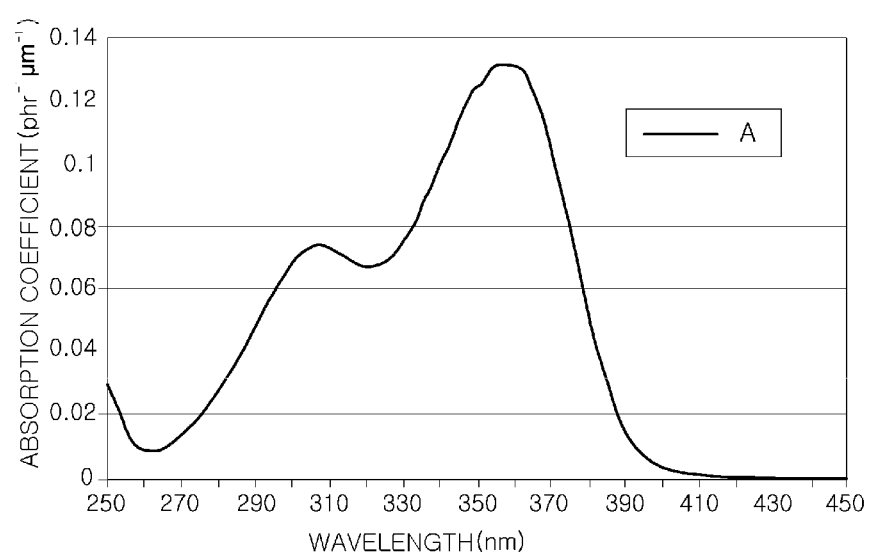
FIG. 1 is an absorption spectrum that shows an absorption coefficient according to the wavelength of an ultraviolet light absorbent A.

Exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

An optical film of an exemplary embodiment of the present disclosure includes an ultraviolet light absorbent having a first peak with a maximum absorption coefficient of 0.07 to 0.10 $phr^{-1}\mu m^{-1}$ in a wavelength band of 290 to 320 nm and a second peak with a maximum absorption coefficient of 0.11 to 0.16 $phr^{-1}\mu m^{-1}$ in a wavelength band of 330 to 400 nm, and an acrylic resin, wherein the content of the ultraviolet light absorbent is 0.3 to 1.0 parts by weight with respect to 100 parts by weight of the acrylic resin.

In an absorption spectrum showing an absorption coefficient according to the wavelength calculated using the following Equations (1) and (2), the ultraviolet light absorbent of an exemplary embodiment of the present disclosure has a first peak with a maximum absorption coefficient of 0.07 to 0.10 phr$^{-1}$µm$^{-1}$ in a wavelength band of 290 to 320 nm and a second peak with a maximum absorption coefficient of 0.11 to 0.16 phr$^{-1}$µm$^{-1}$ in a wavelength band of 330 to 400 nm, preferably has a first peak with a maximum absorption coefficient of 0.075 to 0.095 phr$^{-1}$µm$^{-1}$ in a wavelength band of 290 to 320 nm and a second peak with a maximum absorption coefficient of 0.125 to 0.160 phr$^{-1}$µm$^{-1}$ in a wavelength band of 330 to 400 nm, and more preferably has a first peak with a maximum absorption coefficient of 0.075 to 0.085 phr$^{-1}$µm$^{-1}$ in a wavelength band of 290 to 320 nm and a second peak with a maximum absorption coefficient of 0.125 to 0.155 phr$^{-1}$µm$^{-1}$ in a wavelength band of 330 to 400 nm.

$$A = -\log T \quad \text{Equation (1)}$$

$$A = \epsilon bc \quad \text{Equation (2)}$$

In Equations (1) and (2), A represents absorbance, T represents transmittance, $\epsilon$ represents an absorption coefficient, b represents a film thickness (µm), and c represents a concentration of the ultraviolet light absorbent (parts by weight). The absorption coefficient value is obtained by calculation after the ultraviolet light absorbent is added to the film, and the unit thereof is phr$^{-1}$µm$^{-1}$, and for reference, the unit of absorbance is dimensionless.

In the case described above, the ultraviolet light absorbent may effectively absorb ultraviolet light even from within a wide wavelength band of 290 to 400 nm. More specifically, for sunlight ultraviolet light, a wavelength band of 320 to 400 nm is referred to as a UVA region, and a wavelength band of 290 to 320 nm is referred to as a UVB region, and the UVA region is not absorbed in an ozone layer and also has high intensity thereby needs to be blocked without fail, and although the UVB region is mostly absorbed in an ozone layer, the UVB region needs to be blocked even in the case that the amount of UVB light reaching to the ground is small, since it has a short wavelength and therefore has a high degree of energy. When the ultraviolet light absorbent satisfies the conditions described above, the ultraviolet light absorbent effectively absorbs all ultraviolet light in the UVA and UVB regions, and as a result, ultraviolet light having a bad influence on the optical properties of a polarizer can be prevented.

Meanwhile, the ultraviolet light absorbent of an exemplary embodiment of the present disclosure, although not limited thereto, may include one or more compounds selected from the group consisting of a compound represented by the following Chemical Formula 1 and a compound represented by the following Chemical Formula 2. In other words, the ultraviolet light absorbent may be an ultraviolet light absorbent including a compound represented by the following Chemical Formula 1, an ultraviolet light absorbent including a compound represented by the following Chemical Formula 2, or an ultraviolet light absorbent including both a compound represented by the following Chemical Formula 1 and a compound represented by the following Chemical Formula 2. However, among others, it is particularly preferable that the ultraviolet light absorbent include a compound represented by the following Chemical Formula 1 as a main component, and for example, an ultraviolet light absorbent including 80 mol % or more, preferably 90 mol % or more, and more preferably 94 mol % or more of a compound represented by the following Chemical Formula 1 in the total ultraviolet light absorbent composition is particularly preferable in terms of having the effects of an exemplary embodiment of the present disclosure described above.

[Chemical Formula 1]

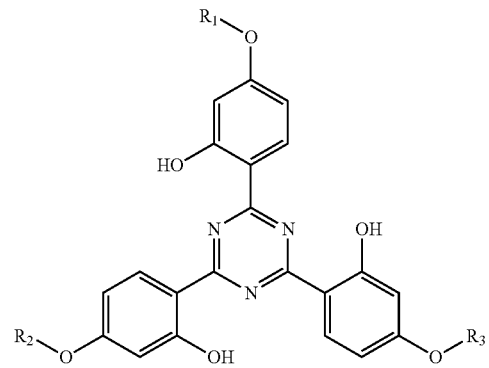

In Chemical Formula 1, $R_1$ to $R_3$ are each independently a substituted or an unsubstituted $C_{1-18}$ alkyl.

Herein, in Chemical Formula 1, examples of the substituted or the unsubstituted $C_{1-18}$ alkyl represented by $R_1$ to $R_3$ include, but are not limited to, methyl, ethyl, propyl, isopropyl, butyl, secondary butyl, tertiary butyl, isobutyl, amyl, isoamyl, tertiary amyl, hexyl, heptyl, 2-methylhexyl, isoheptyl, tertiary heptyl, n-octyl, isooctyl, tertiary octyl, 2-ethylhexyl, nonyl, isononyl, decyl, dodecyl, tridecyl, tetradecyl, pentadecyl, hexadecyl, heptadecyl, octadecyl, cyclopentyl, cyclohexyl, cycloheptyl, chloromethyl, dichloromethyl, trichloromethyl, 2-hydroxyethyl, 2-hydroxypropyl, 3-hydroxypropyl, 2-methoxyethyl, 2-ethoxyethyl, 2-butoxyethyl, 2-methoxypropyl, 3-methoxypropyl and the like.

[Chemical Formula 2]

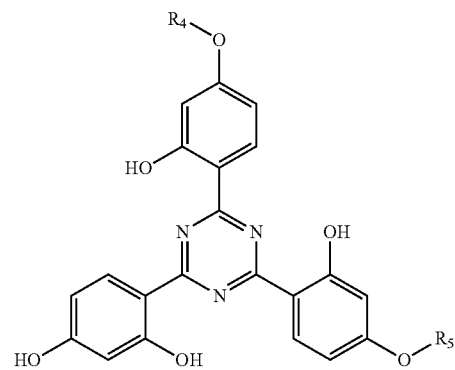

In Chemical Formula 2, $R_4$ and $R_5$ are each independently hydrogen or a substituted or an unsubstituted $C_{1-18}$ alkyl.

Herein, in Chemical Formula 2, examples of the substituted or the unsubstituted $C_{1-18}$ alkyl represented by $R_4$ and $R_5$ include, but are not limited to, methyl, ethyl, propyl, isopropyl, butyl, secondary butyl, tertiary butyl, isobutyl, amyl, isoamyl, tertiary amyl, hexyl, heptyl, 2-methylhexyl, isoheptyl, tertiary heptyl, n-octyl, isooctyl, tertiary octyl, 2-ethylhexyl, nonyl, isononyl, decyl, dodecyl, tridecyl, tetradecyl, pentadecyl, hexadecyl, heptadecyl, octadecyl, cyclopentyl, cyclohexyl, cycloheptyl, chloromethyl, dichloromethyl, trichloromethyl, 2-hydroxyethyl, 2-hydroxypropyl, 3-hydroxypropyl, 2-methoxyethyl, 2-ethoxyethyl, 2-butoxyethyl, 2-methoxypropyl, 3-methoxypropyl and the like.

In addition, $R_1$ to $R_3$ of Chemical Formula 1 are each independently more preferably an unsubstituted $C_{1-6}$ alkyl, even more preferably an unsubstituted $C_{3-5}$ alkyl, and $R_4$ and $R_5$ of Chemical Formula 2 are each independently more preferably hydrogen or an unsubstituted $C_{1-6}$ alkyl, and even more preferably hydrogen or an unsubstituted $C_{3-5}$ alkyl.

More specifically, the ultraviolet light absorbent of an exemplary embodiment of the present disclosure, although not limited thereto, may include one or more compounds selected from the group consisting of a compound represented by the following Chemical Formula 1-1 and a compound represented by the following Chemical Formula 2-1. In other words, the ultraviolet light absorbent may be an ultraviolet light absorbent including a compound represented by the following Chemical Formula 1-1, an ultraviolet light absorbent including a compound represented by the following Chemical Formula 2-1, or an ultraviolet light absorbent including both a compound represented by the following Chemical Formula 1-1 and a compound represented by the following Chemical Formula 2-1.

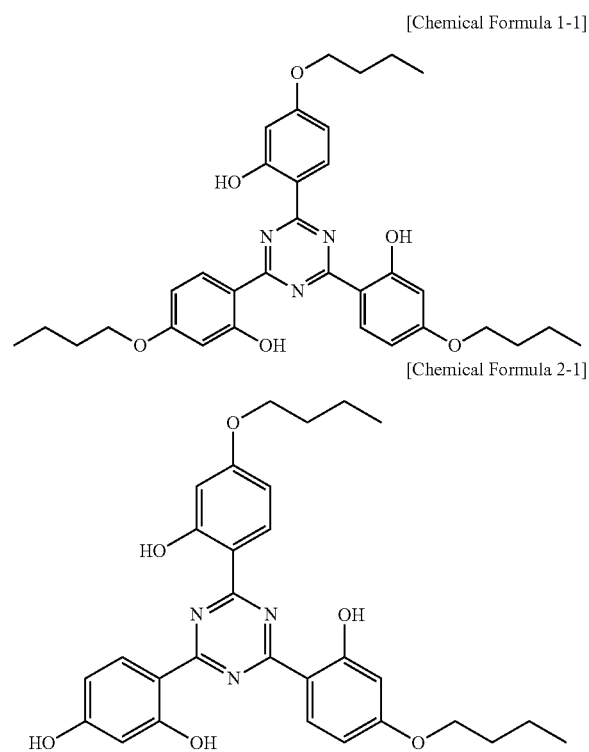

[Chemical Formula 1-1]

[Chemical Formula 2-1]

Meanwhile, the content of the ultraviolet light absorbent of an exemplary embodiment of the present disclosure may be 0.3 to 1.0 parts by weight with respect to 100 parts by weight of the acrylic resin. When the content of the ultraviolet light absorbent is less than 0.3 parts by weight, sufficient ultraviolet light-blocking effects cannot be exhibited, and when the content of the ultraviolet light absorbent is greater than 1.0 parts by weight, migration, a phenomenon in which an ultraviolet light absorbent strains a casting roll as it is decomposed and escapes from the film when the acrylic resin, melted by high temperature and pressure from an extruder, abruptly goes cold while passing through a T-die and then a casting roll, may be a problem in an acrylic film preparation process, and when migration becomes serious, the exterior of the film becomes poor since the heat decomposed-ultraviolet light absorbent also strains the film.

Furthermore, the ultraviolet light absorbent preferably has a molecular weight of 400 to 600 g/mol and more preferably has a molecular weight of 500 to 600 g/mol when considering processability and productivity. When the molecular weight is lower than the above range, the ultraviolet light absorbent has a problem of being weak against heat, and when the molecular weight is higher than the above range, there is a problem of increasing the content of the ultraviolet light absorbent since the added number of moles may be decreased accordingly. The ultraviolet light absorbent needs to have a maximal effect at a minimal amount; therefore, having a molecular weight of a proper range described above is preferable.

Next, in an exemplary embodiment of the present disclosure, the acrylic resin has a (meth)acrylate-based monomer as a main component, and its concept includes not only a homopolymer resin formed of (meth)acrylate-based monomers, but also a copolymer resin in which other monomer units are copolymerized in addition to (meth)acrylate-based monomers, and a blend resin in which other resins are blended to the acrylic resin such as above. Examples of the other resins include, but are not limited to, a polycarbonate-based resin and the like, and herein, the polycarbonate-based resin may be a polycarbonate-based resin including an aromatic ring within the molecule, or a polycarbonate-based resin including an aliphatic ring within the molecule.

Herein, the concept of the (meth)acrylate-based monomer includes not only acrylate and methacrylate, but also the derivative of acrylate and methacrylate, and examples thereof include methyl methacrylate, ethyl methacrylate, propyl methacrylate, n-butyl methacrylate, t-butyl methacrylate, cyclohexyl methacrylate, phenyl methacrylate, benzyl methacrylate, methoxyethyl methacrylate, ethoxyethyl methacrylate, butoxymethyl methacrylate, methyl acrylate, ethyl acrylate, propyl acrylate, n-butyl acrylate, t-butyl acrylate, cyclohexyl acrylate, phenyl acrylate, benzyl acrylate, methoxyethyl acrylate, ethoxyethyl acrylate, butoxymethyl acrylate, oligomers thereof, or the like, and among these, alkyl (meth)acrylate such as methyl methacrylate and methyl acrylate is more preferable but the examples are not limited thereto. These may be used either alone or as a mixture.

Meanwhile, in order to improve heat resistance, the acrylic resin may include a maleic anhydride-based monomer, a maleimide-based monomer and the like as the other monomers in addition to the (meth)acrylate-based monomer. Among these, including a maleic anhydride-based monomer or a maleimide-based monomer is more preferable. Herein, examples of the maleic anhydride-based monomer include maleic anhydride, methyl maleic anhydride, ethyl maleic anhydride, propyl maleic anhydride, isopropyl maleic anhydride, cyclohexyl maleic anhydride, phenyl maleic anhydride and the like; and examples of the maleimide-based monomer include maleimide, N-methyl maleimide, N-ethyl maleimide, N-propyl maleimide, N-isopropyl maleimide, N-cyclohexyl maleimide, N-phenyl maleimide and the like, but the examples are not limited thereto. These may be used either alone or as a mixture.

Meanwhile, in order to enhance negative phase difference properties, the acrylic resin may include a styrene-based monomer as the other monomers in addition to the (meth) acrylate-based monomer. Examples of the styrene-based monomer include styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, 4-hydroxystyrene and the like, and among these, styrene and α-methylstyrene are more preferable. These may be used either alone or as a mixture.

In addition, a mixture of two or more types of the styrene-based monomer, the maleic anhydride-based monomer and the maleimide-based monomer may be used with the (meth)acrylate-based monomer in the acrylic resin. For example, the acrylic resin may include a (meth)acrylate-based monomer; and one or more monomers selected from the group consisting of a styrene-based monomer, a maleic anhydride-based monomer and a maleimide-based monomer.

More specifically, the acrylic resin may include, but not limited to, a cyclohexyl maleic anhydride-methyl methacrylate copolymer, an N-cyclohexyl maleimide-methyl methacrylate copolymer, a styrene-cyclohexyl maleic anhydride-methyl methacrylate copolymer, a styrene-N-cyclohexyl maleimide-methyl methacrylate copolymer, an α-methylstyrene-N-cyclohexyl maleimide-methyl methacrylate copolymer, an α-methylstyrene-N-phenyl maleimide-methyl methacrylate copolymer, an N-phenylmaleimide-co-methylmethacrylate-co-α-methyl-styrene-co-methacrylate copolymer and the like.

More specifically, the acrylic resin of an exemplary embodiment of the present disclosure may be particularly an acrylic resin having a ring structure represented by the following Chemical Formula 3 or 4 in the main chain. The acrylic resin having a ring structure represented by the following Chemical Formula 3 or 4 in the main chain has an advantage in that the heat resistance thereof is particularly excellent due to a high glass transition temperature.

[Chemical Formula 3]

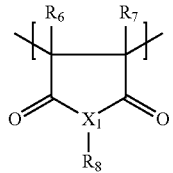

In Chemical Formula 3, $R_6$ and $R_7$ are each independently a hydrogen atom or $C_{1-6}$ alkyl; $X_1$ is an oxygen atom or a nitrogen atom; and when $X_1$ is an oxygen atom, $R_8$ does not exist, and when $X_1$ is a nitrogen atom, $R_8$ is a hydrogen atom, $C_{1-6}$ alkyl, cyclopentyl, cyclohexyl or phenyl. Herein, in $R_6$ and $R_7$, the $C_{1-6}$ alkyl may be linear or branched, and one or more hydrogens of the alkyl may be substituted with any substituents. In addition, in $R_8$, the $C_{1-6}$ alkyl may be linear alkyl.

[Chemical Formula 4]

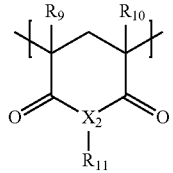

In Chemical Formula 4, $R_9$ and $R_{10}$ are each independently a hydrogen atom or $C_{1-6}$ alkyl; $X_2$ is an oxygen atom or a nitrogen atom; and when $X_2$ is an oxygen atom, $R_{11}$ does not exist, and when $X_2$ is a nitrogen atom, $R_{11}$ is a hydrogen atom, $C_{1-6}$ alkyl, cyclopentyl, cyclohexyl or phenyl. Herein, in $R_9$ and $R_{10}$, the $C_{1-6}$ alkyl may be linear or branched, and one or more hydrogens of the alkyl may be substituted with any substituents. In addition, in $R_{11}$, the $C_{1-6}$ alkyl may be linear alkyl.

Meanwhile, the optical film of an exemplary embodiment of the present disclosure described above may be prepared using a resin composition prepared by mixing the ultraviolet light absorbent with the acrylic resin. More specifically, the optical film of an exemplary embodiment of the present disclosure may be prepared by preparing the acrylic resin mixed with the ultraviolet light absorbent in a film form using a method well known in the art, such as a solution casting method or an extrusion method. Using an extrusion method is more preferable considering economic aspects. According to circumstances, additives such as an amendment may be additionally added during the film preparation process within the limit that does not damage the properties of the film, and a uniaxial or biaxial orientation step may be additionally carried out.

In the orientation process, a machine direction (MD) orientation and a transverse direction (TD) orientation may be separately or jointly carried out. In addition, when the machine direction orientation and the transverse direction orientation are jointly carried out, any one direction may be oriented first prior to another direction, or both directions may be oriented at the same time. Furthermore, the orientation may be carried out in one step or over multiple steps. In the case of the machine direction orientation, the orientation by speed difference between rolls may be carried out, and in the case of the transverse direction orientation, a tenter may be used. The rail start angle of the tenter is normally 10 degrees or less in order to suppress a bowing phenomenon occurring when the transverse direction orientation is carried out, and to regularly control the angle of the optic axis. The bowing suppression effect may also be obtained when the transverse direction orientation is carried out over multiple steps.

In addition, the orientation may be carried out within a temperature range of (Tg−20°) C. to (Tg+30°) C. The temperature range indicates a region from a temperature at which the storage modulus of a resin composition starts to decrease and accordingly the loss modulus starts to be greater than the storage modulus, to a temperature at which the orientation of a polymer chain is eased and disappeared. Alternatively, the temperature at which the orientation process is carried out may be a glass transition temperature of the resin composition. The glass transition temperature of the resin composition may be measured using a differential scanning calorimeter (DSC). For example, when a differential scanning calorimeter (DSC) is used, a sample of approximately 10 mg is sealed in an exclusive pan, and when the sample is heated under constant heating conditions, the glass transition temperature may be measured by drawing the amount of heat absorbed and dissipated as phase variation occurs according to temperatures.

The orientation operation may be carried out at an orientation rate ranging from 1 to 100 mm/min range for a small orientation apparatus (Universal Testing Machine, Zwick Z010), and at an orientation rate ranging from 0.1 to m/min for a pilot orientation apparatus, and the magnification of orientation may be approximately 5 to 300%.

The optical film of an exemplary embodiment of the present disclosure prepared as above may have optical transmittance of 5.5% or less at a wavelength of 290 nm and at a wavelength of 380 nm when measured after conversion into a thickness of 50 µm. In addition, the optical film may have optical transmittance of 92% or greater in a visible light region. When the optical transmittance at a wavelength of 290 nm and at a wavelength of 380 nm is 5.5% or less, ultraviolet light in both UVA and UVB regions may be effectively blocked, and when the optical transmittance in a visible light region is 92% or greater, the transparency and the color of the film is superior.

The optical film of an exemplary embodiment of the present disclosure prepared as above preferably has a thickness of 5 to 80 µm, and more preferably 5 to 50 µm. As verified in Equations (1) and (2), the absorbance increases as the thickness-related b value increases, therefore, the absorbance increases as the thickness of the film increases, however, the film being too thick is not preferable considering the trend of products becoming thinner in modern industries. However, when the film is thin, the content of the ultraviolet light absorbent needs to be increased since the ultraviolet light-blocking effects are reduced, and in this case, may accompanying problems such as the increase of costs may arise. Therefore, it is preferable that an economical content of an ultraviolet light absorbent within a proper thickness range be used in order to efficiently absorb ultraviolet light.

The optical film of an exemplary embodiment of the present disclosure may be useful as a polarizing plate protective film by being attached to one or both sides of a polarizer. Herein, the polarizer and the optical film of an exemplary embodiment of the present disclosure may be attached using a method of applying an adhesive on the surface of the film or the polarizer using a roll coater, a gravure coater, a bar coater, a knife coater, a capillary coater or the like, and then heat laminating the protective film and the polarizer using a laminating roll, or laminating by compression at room temperature. Meanwhile, as the adhesive, adhesives used in the art, such as polyvinyl alcohol-based adhesives, polyurethane-based adhesives, acrylic adhesives and the like may be used without limit.

In addition, the optical film of an exemplary embodiment of the present disclosure may be used in various image display units such as liquid crystal displays, plasma displays and electroluminescent apparatuses.

MODE FOR INVENTION

Hereinafter, an exemplary embodiment of the present disclosure will be described in more detail with reference to specific examples.

Ultraviolet Light Absorbent

Figure 2:
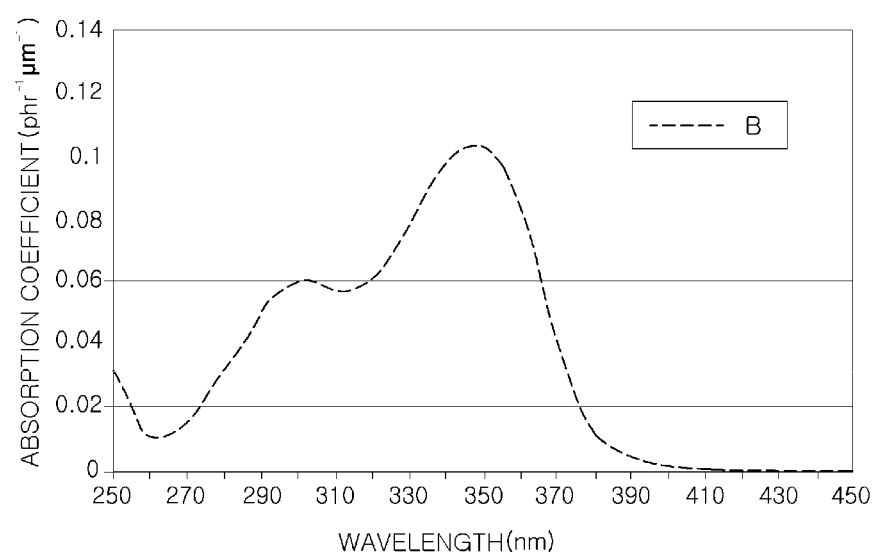
FIG. 2 is an absorption spectrum that shows an absorption coefficient according to the wavelength of an ultraviolet light absorbent B.
Figure 3:
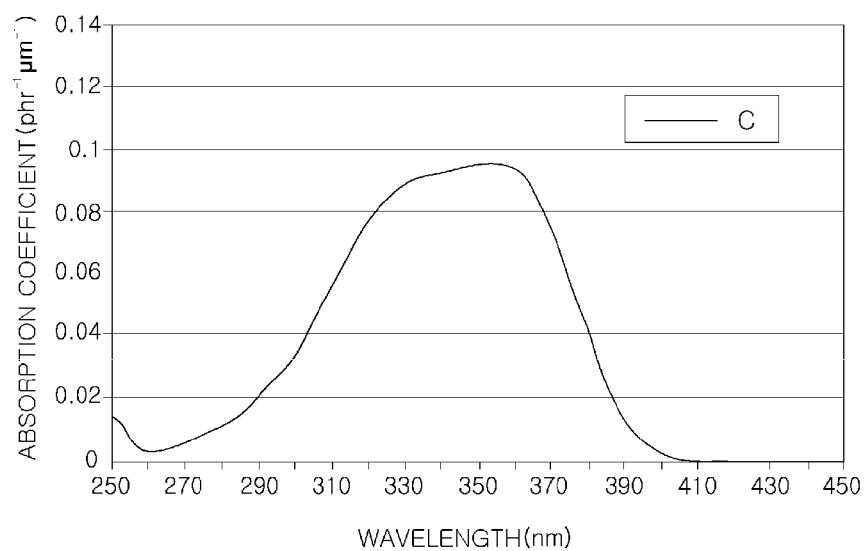
FIG. 3 is an absorption spectrum that shows an absorption coefficient according to the wavelength of an ultraviolet light absorbent C.
Figure 4:
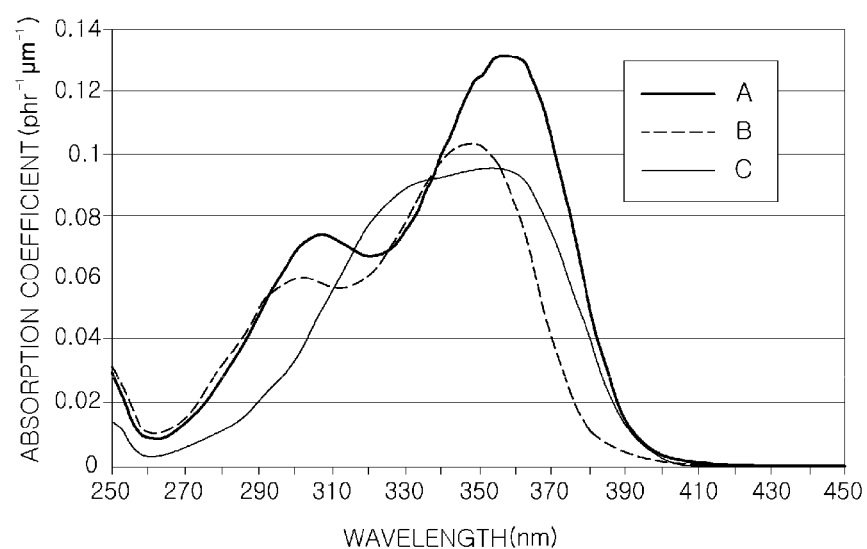
FIG. 4 is an absorption spectrum that compares the absorption coefficients according to the wavelengths of ultraviolet light absorbents A to C.

Absorption coefficients of various types of ultraviolet light absorbents used for experiments were measured according to components and wavelengths. Herein, an absorption coefficient of each ultraviolet light absorbent was calculated using the following Equations (1) and (2), and the measurement results are illustrated in the following FIG. 1 to FIG. 4.

$$A = -\log T \qquad \text{Equation (1)}$$

$$A = \epsilon bc \qquad \text{Equation (2)}$$

In Equations (1) and (2), A represents absorbance, T represents transmittance, $\epsilon$ represents an absorption coefficient, b represents a film thickness (µm), and c represents a concentration of the ultraviolet light absorbent (parts by weight). The absorption coefficient value is obtained by calculation after the ultraviolet light absorbent is added to the film, and the unit thereof is $phr^{-1}\mu m^{-1}$, and for reference, the unit of absorbance is dimensionless.

As illustrated in the following FIG. 1 to FIG. 4, ① the ultraviolet light absorbent A had a first peak with a maximum absorption coefficient of 0.073 to 0.074 $phr^{-1}\mu m^{-1}$ in a wavelength band of 290 to 320 nm, and a second peak with a maximum absorption coefficient of 0.130 to 0.131 $phr^{-1}\mu m^{-1}$ in a wavelength band of 330 to 400 nm, ② the ultraviolet light absorbent B had a first peak with a maximum absorption coefficient of 0.060 to 0.061 $phr^{-1}\mu m^{-1}$ in a wavelength band of 290 to 320 nm, and a second peak with a maximum absorption coefficient of 0.103 to 0.104 $phr^{-1}\mu m^{-1}$ in a wavelength band of 330 to 400 nm, and ③ the ultraviolet light absorbent C had one peak with a maximum absorption coefficient of 0.094 to 0.095 $phr^{-1}\mu m^{-1}$ in a wavelength band of 330 to 400 nm.

In addition, each ultraviolet light absorbent includes the compounds illustrated in the following Table 1 as a main component, and in addition to this, includes other unavoidable impurities. Meanwhile, among the compounds a and b, the ultraviolet light absorbent A particularly includes the compound a as a main component (80 mol % or more).

TABLE 1

| Ultraviolet Light Absorbent | Category | Structural Formula of Compound |
|---|---|---|
| A | Compound a | 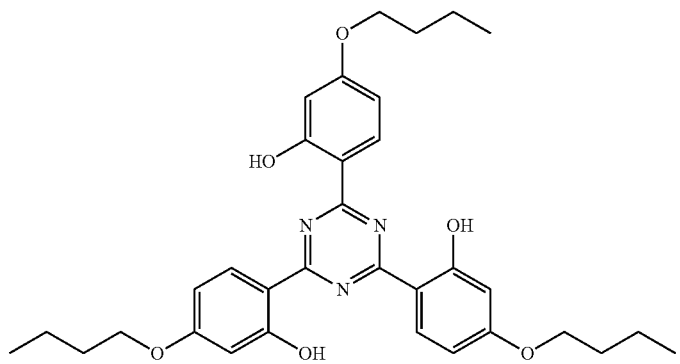 [SMILES: CCCCOc1ccc(-c2nc(-c3ccc(OCCCC)cc3O)nc(-c3ccc(OCCCC)cc3O)n2)c(O)c1] |

TABLE 1-continued

| Ultraviolet Light Absorbent | Category | Structural Formula of Compound |
|---|---|---|
| | Compound b | (structure shown) |
| B | Compound c | (structure shown) |
| C | Compound d | (structure shown) |

Example 1

A raw material pellet was prepared by supplying a resin composition, in which 0.5 parts by weight of the ultraviolet light absorbent A was uniformly mixed with 100 parts by weight of poly(N-phenylmaleimide-co-methylmethacrylate-co-α-methyl-styrene-co-methacrylate) having a glass transition temperature of 120° C., to a 24 φ extruder in which from a raw material hopper to an extruder was substituted with nitrogen, and melting the resin composition at 250° C. An NMR analysis result showed that the poly(N-phenylmaleimide-co-methylmethacrylate-co-α-methyl-styrene-co-methacrylate) resin had a content of N-phenylmaleimide in 5.0% by weight and α-methyl-styrene in 2.0% by weight.

The raw material pellet prepared above was dried under vacuum, melted using an extruder at 250° C., and then passed through a coat hanger-type T-die, a chromium-plated casting roll, a drying roll and the like, and as a result, a film having a thickness of 160 μm was prepared.

A biaxially oriented film having a thickness of 50 μm was prepared by orienting this film twice the length toward each MD and TD direction at 130 to 135° C. using a laboratory film orientation apparatus.

Example 2

An acrylic optical film was prepared in the same manner as in Example 1, except that 0.7 parts by weight of the ultraviolet light absorbent A was uniformly mixed as the ultraviolet light absorbent.

Example 3

An acrylic optical film was prepared in the same manner as in Example 1, except that 1.0 parts by weight of the ultraviolet light absorbent A was uniformly mixed as the ultraviolet light absorbent.

Comparative Example 1

An acrylic optical film was prepared in the same manner as in Example 1, except that 2.5 parts by weight of the ultraviolet light absorbent A was uniformly mixed as the ultraviolet light absorbent.

Comparative Example 2

An acrylic optical film was prepared in the same manner as in Example 1, except that 4.0 parts by weight of the ultraviolet light absorbent A was uniformly mixed as the ultraviolet light absorbent.

Comparative Example 3

An acrylic optical film was prepared in the same manner as in Example 1, except that 0.5 parts by weight of the ultraviolet light absorbent B was uniformly mixed as the ultraviolet light absorbent.

Comparative Example 4

An acrylic optical film was prepared in the same manner as in Example 1, except that 0.7 parts by weight of the ultraviolet light absorbent B was uniformly mixed as the ultraviolet light absorbent.

Comparative Example 5

An acrylic optical film was prepared in the same manner as in Example 1, except that 1.0 parts by weight of the ultraviolet light absorbent B was uniformly mixed as the ultraviolet light absorbent.

Comparative Example 6

An acrylic optical film was prepared in the same manner as in Example 1, except that 2.5 parts by weight of the ultraviolet light absorbent B was uniformly mixed as the ultraviolet light absorbent.

Comparative Example 7

An acrylic optical film was prepared in the same manner as in Example 1, except that 4.0 parts by weight of the ultraviolet light absorbent B was uniformly mixed as the ultraviolet light absorbent.

Comparative Example 8

An acrylic optical film was prepared in the same manner as in Example 1, except that 0.5 parts by weight of the ultraviolet light absorbent C was uniformly mixed as the ultraviolet light absorbent.

Comparative Example 9

An acrylic optical film was prepared in the same manner as in Example 1, except that 0.7 parts by weight of the ultraviolet light absorbent C was uniformly mixed as the ultraviolet light absorbent.

Comparative Example 10

An acrylic optical film was prepared in the same manner as in Example 1, except that 1.0 parts by weight of the ultraviolet light absorbent C was uniformly mixed as the ultraviolet light absorbent.

Comparative Example 11

An acrylic optical film was prepared in the same manner as in Example 1, except that 2.5 parts by weight of the ultraviolet light absorbent C was uniformly mixed as the ultraviolet light absorbent.

Comparative Example 12

An acrylic optical film was prepared in the same manner as in Example 1, except that 4.0 parts by weight of the ultraviolet light absorbent C was uniformly mixed as the ultraviolet light absorbent.

The optical transmittance and the degree of migration occurrence of the optical film in Examples 1 to 3 and Comparative Examples 1 to 12 were measured and the results are illustrated in the following Table 2. The measurement methods are as follows.

1. Optical transmittance: the optical transmittance was measured using a U-3310 spectrometer manufactured by Hitachi, Ltd.

2. Degree of migration occurrence: the raw material pellet was prepared by supplying the resin composition, in which the acrylic resin described in each example was uniformly mixed with the ultraviolet light absorbent of each type and content described in each example, to a 24ϕ extruder in which from a raw material hopper to an extruder was substituted with nitrogen, and melting the resin composition at 250° C. This raw material pellet was extruded to a film using the same extruder at a high temperature of 290° C., and the degree of casting roll contamination was observed for 5 hours, and marked as good, fair or poor. Here, 'good' is a condition with the least migration, and 'poor' is a condition with the most serious migration.

TABLE 2

| | Ultraviolet Light Absorbent | Content (Parts by Weight) | Optical Transmittance (% T) | | | Migration |
| --- | --- | --- | --- | --- | --- | --- |
| | | | % $T\_290$ nm | % $T\_320$ nm | % $T\_380$ nm | |
| Example 1 | A | 0.5 | 5.3 | 1.8 | 4.6 | Good |
| Example 2 | | 0.7 | 1.8 | 0.4 | 1.4 | Good |
| Example 3 | | 1.0 | 0.3 | 0.0 | 0.2 | Good |
| Comparative Example 1 | | 2.5 | 0.0 | 0.0 | 0.0 | Fair |
| Comparative Example 2 | | 4.0 | 0.0 | 0.0 | 0.0 | Poor |
| Comparative Example 3 | B | 0.5 | 4.9 | 2.7 | 39.0 | Good |
| Comparative Example 4 | | 0.7 | 1.6 | 0.7 | 27.9 | Good |
| Comparative | | 1.0 | 0.3 | 0.1 | 16.8 | Fair |

TABLE 2-continued

| | Ultraviolet Light Absorbent | Content (Parts by Weight) | Optical Transmittance (% T) | | | Migration |
| --- | --- | --- | --- | --- | --- | --- |
| | | | % T_290 nm | % T_320 nm | % T_380 nm | |
| Example 5 Comparative Example 6 | | 2.5 | 0.0 | 0.0 | 1.4 | Poor |
| Comparative Example 7 | | 4.0 | 0.0 | 0.0 | 0.1 | Poor |
| Comparative Example 8 | C | 0.5 | 25.5 | 1.0 | 9.3 | Good |
| Comparative Example 9 | | 0.7 | 15.9 | 0.2 | 3.8 | Good |
| Comparative Example 10 | | 1.0 | 7.8 | 0.0 | 1.0 | Good |
| Comparative Example 11 | | 2.5 | 0.2 | 0.0 | 0.0 | Fair |
| Comparative Example 12 | | 4.0 | 0.0 | 0.0 | 0.0 | Poor |

The optical transmittance (% T) in Table 2 shows the optical transmittance of the film, and is the amount of light transmitted % when the total optical transmittance is set to 100. As illustrated in Examples 1 to 3, the optical film of an exemplary embodiment of the present disclosure all had optical transmittance of 5.5% or less in 290 nm, 320 nm and 380 nm wavelength regions even with a small amount of the ultraviolet light absorbent, thereby had an excellent effect in effectively lowering the optical transmittance in both UVA and UVB regions.

However, when the content of the ultraviolet light absorbent A exceeded 1.0 as in Comparative Examples 1 and 2, it was seen that migration occurred.

In addition, in the optical films that did not comply with an exemplary embodiment of the present disclosure as in Comparative Examples 3 to 12, the optical transmittance in a 290 nm region was greater than 5.5%, or the optical transmittance in a 380 nm region was greater than 5.5%, therefore, the optical film was not capable of effectively lowering the optical transmittance in both UVA and UVB regions, and it was seen that, when the optical transmittance was lowered by excessively adding the ultraviolet light absorbent, migration occurred.

While exemplary embodiments have been shown and described above, it will be apparent to those skilled in the art that modifications and variations could be made without departing from the spirit and scope of the present disclosure as defined by the appended claims.

The invention claimed is:

1. An optical film comprising:
an ultraviolet light absorbent having a first peak with a maximum absorption coefficient of 0.07 to 0.10 $phr^{-1}\mu m^{-1}$ in a wavelength band of 290 to 320 nm and a second peak with a maximum absorption coefficient of 0.11 to 0.16 $phr^{-1}\mu m^{-1}$ in a wavelength band of 330 to 400 nm; and
an acrylic resin,
wherein the content of the ultraviolet light absorbent is 0.3 to 1.0 parts by weight with respect to 100 parts by weight of the acrylic resin,
wherein the ultraviolet light absorbent consists of one or more compounds selected from the group consisting of a compound represented by the following Chemical Formula 1 and a compound represented by Chemical Formula 2:

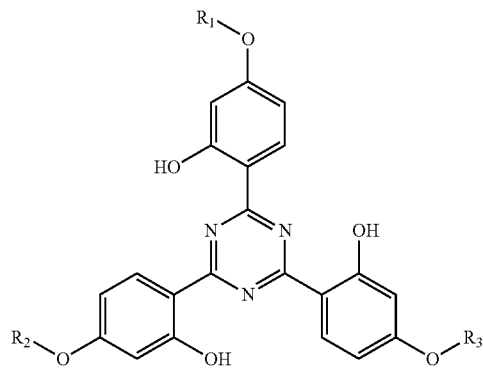

[Chemical Formula 1]

wherein, in Chemical Formula 1, $R_1$ to $R_3$ are each independently a substituted or an unsubstituted $C_{3-5}$ alkyl; and

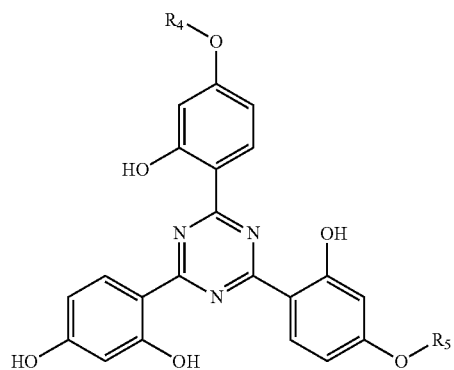

[Chemical Formula 2]

in Chemical Formula 2, $R_4$ and $R_5$ are each independently hydrogen or a substituted or an unsubstituted $C_{3-5}$ alkyl,
wherein the ultraviolet light absorbent has a molecular weight of 400 to 600 g/mol, and
wherein the optical film has transmittance of 5.5% or less at a wavelength of 290 nm and at a wavelength of 380 nm when measured after conversion into a thickness of 50 μm.

2. The optical film of claim 1, wherein $R_1$ to $R_3$ of Chemical Formula 1 are each independently an unsubstituted $C_{3-5}$ alkyl, and $R_4$ and $R_5$ of Chemical Formula 2 are each independently hydrogen or an unsubstituted $C_{3-5}$ alkyl.

3. The optical film of claim 1, wherein the ultraviolet light absorbent includes one or more compounds selected from the group consisting of a compound represented by the following Chemical Formula 1-1 and a compound represented by the following Chemical Formula 2-1:

[Chemical Formula 1-1]

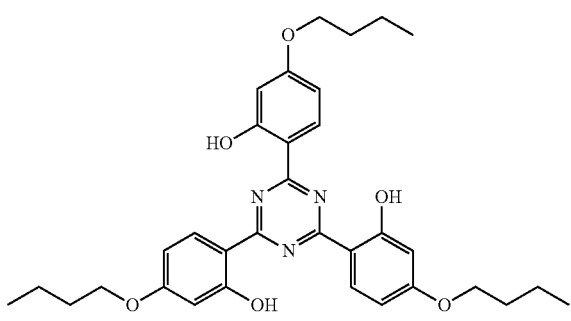

[Chemical Formula 2-1]

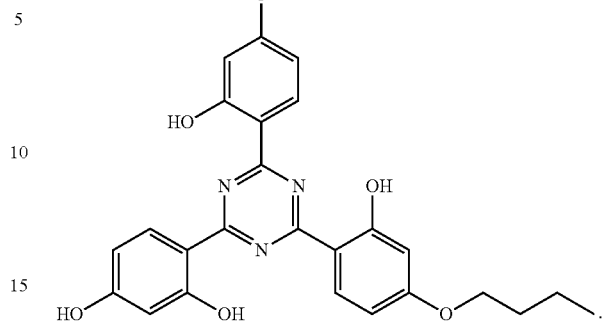

4. The optical film of claim 1, which has optical transmittance of 92% or greater in a visible light region.

5. The optical film of claim 1, which has a thickness of 5 µm to 80 µm.

6. The optical film of claim 1, wherein the acrylic resin is a copolymer resin including an alkyl (meth)acrylate-based monomer and a styrene-based monomer.

7. A polarizing plate comprising:
a polarizer; and
the optical film of claim 1 on one side or both sides of the polarizer.

8. An image display unit comprising the polarizing plate of claim 7.

* * * * *